Oct. 21, 1969   J. A. PEARCE ETAL   3,473,394
DRIVE MECHANISM

Filed Dec. 20, 1967   2 Sheets-Sheet 1

INVENTORS
Emilio M. Binzoni
John A. Pearce

Donald F. Daley
ATTORNEY

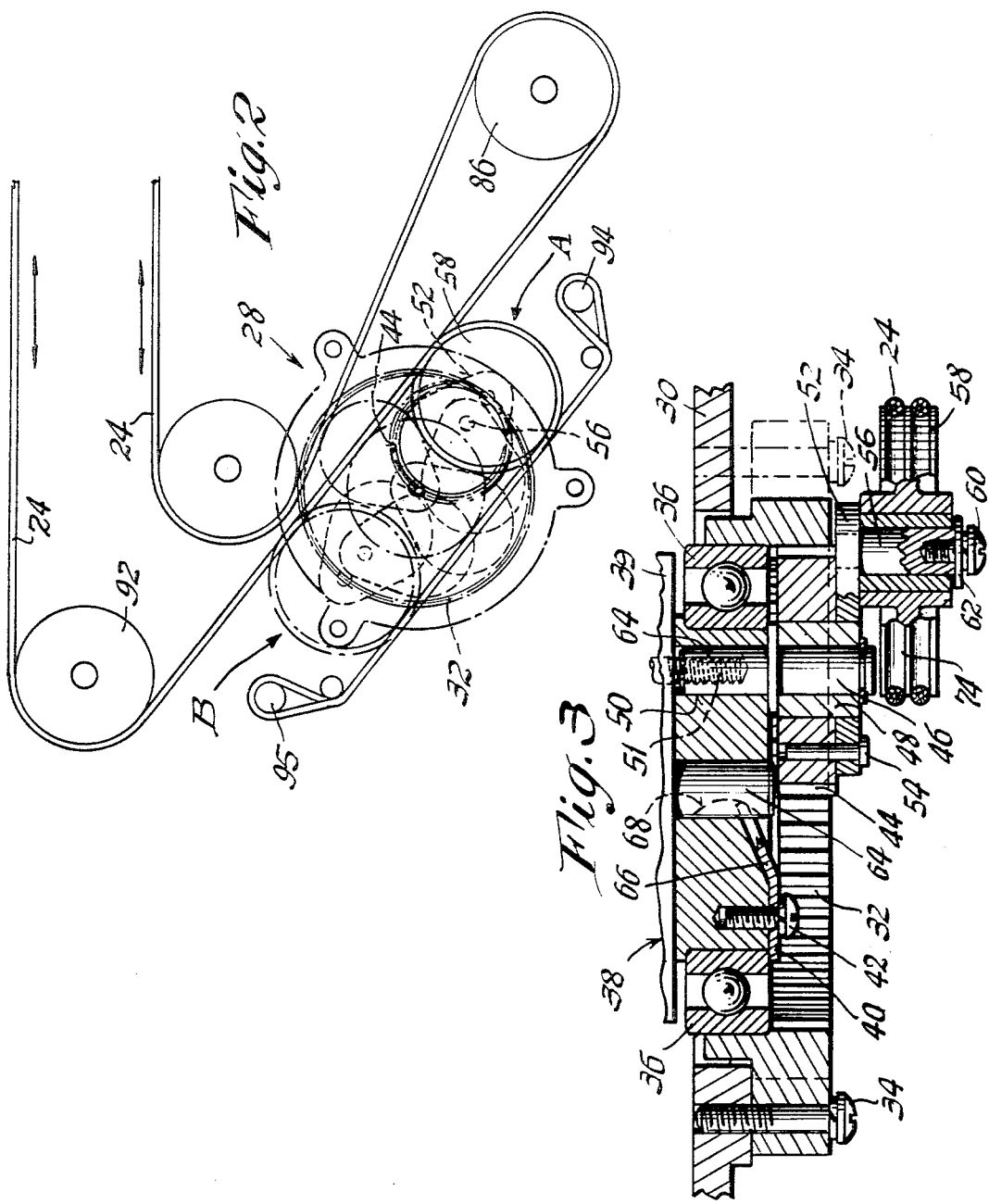

United States Patent Office 3,473,394
Patented Oct. 21, 1969

3,473,394
DRIVE MECHANISM
John A. Pearce, Trumbull, and Emilio M. Binzoni,
Norwalk, Conn., assignors to Pitney-Bowes, Inc.,
Stamford, Conn., a corporation of Delaware
Filed Dec. 20, 1967, Ser. No. 692,098
Int. Cl. F16h 37/16
U.S. Cl. 74—52                    6 Claims

ABSTRACT OF THE DISCLOSURE

A mechanism for translating rotary motion into a straight line reciprocating motion by means of a planetary gear which is orbited about an internal gear and rotated by the internal gear, a pulley mounted on the planetary gear above the pitch circle to reciprocate along a diameter of the internal gear and a cable system which is driven by the pulley.

This invention relates to apparatus for producing straight line reciprocating motion from a rotating drive member, and particularly to a drive mechanism used in imprinting machines to reciprocate a carriage member across a printing station.

Most specifically, the invention relates to cable drive systems wherein a rotary motion is translated into linear movement and used to drive a cable in a manner which produces an elongated linear movement of a movable carriage. The present invention utilizes a drive system constructed on the principles of a Cardano mechanism which converts rotary motion to a linear movement and a modified capstan to drive a cable and carriage through a reciprocating path of movement. In this manner a very small compact mechanism can effectively be used to drive a carriage through a relatively long reciprocating path. A specific application of the present invention is imprinting or address printing machines wherein a roller or printing member is moved back and forth in a rapid non-vibratory manner across a sheet of paper or the like.

It is the primary object of this invention to provide a compact cable drive mechanism for translating a rotary input motion into a linear reciprocating movement.

It is also an object of this invention to provide a compact drive mechanism for a reciprocating carriage in an imprinting machine.

It is also an object of this invention to provide a drive mechanism which reciprocates a carriage member through a path of travel which is greater than the path of movement of the drive member.

It is the further object of this invention to improve the printing carriage drive system in address printing machines or the like to provide a compact, inexpensive, non-vibratory cable drive system.

These and other objects of this invention are attained by means of a drive system having stationary internal gear, a planetary gear having a pitch diameter of one half the pitch diameter of the internal gear, and a pulley rotatably mounted on the planetary gear. The planetary gear is rotated by the internal gear as the planetary gear is moved about the internal gear. The cable pulley is mounted on the planetary gear at the pitch line of the planetary gear and is moved in a straight line back and forth along a diameter of the internal gear to thereby effect movement of a cable system to drive a carriage containing a roller or printing member through a linear path in a reciprocating manner.

For a better understanding of the invention as well as other objects and further features thereof, references had to the following detailed description of the invention to be read in connection with the accompanying drawings, wherein;

FIGURE 2 is a schematic representation of the drive mechanism of FIGURE 1 shown in progressive increments of movement in dotted lines;

FIGURE 3 is a sectional view of the drive mechanism taken along lines 3—3 of FIGURE 1.

GENERAL DESCRIPTION

Figure 1:
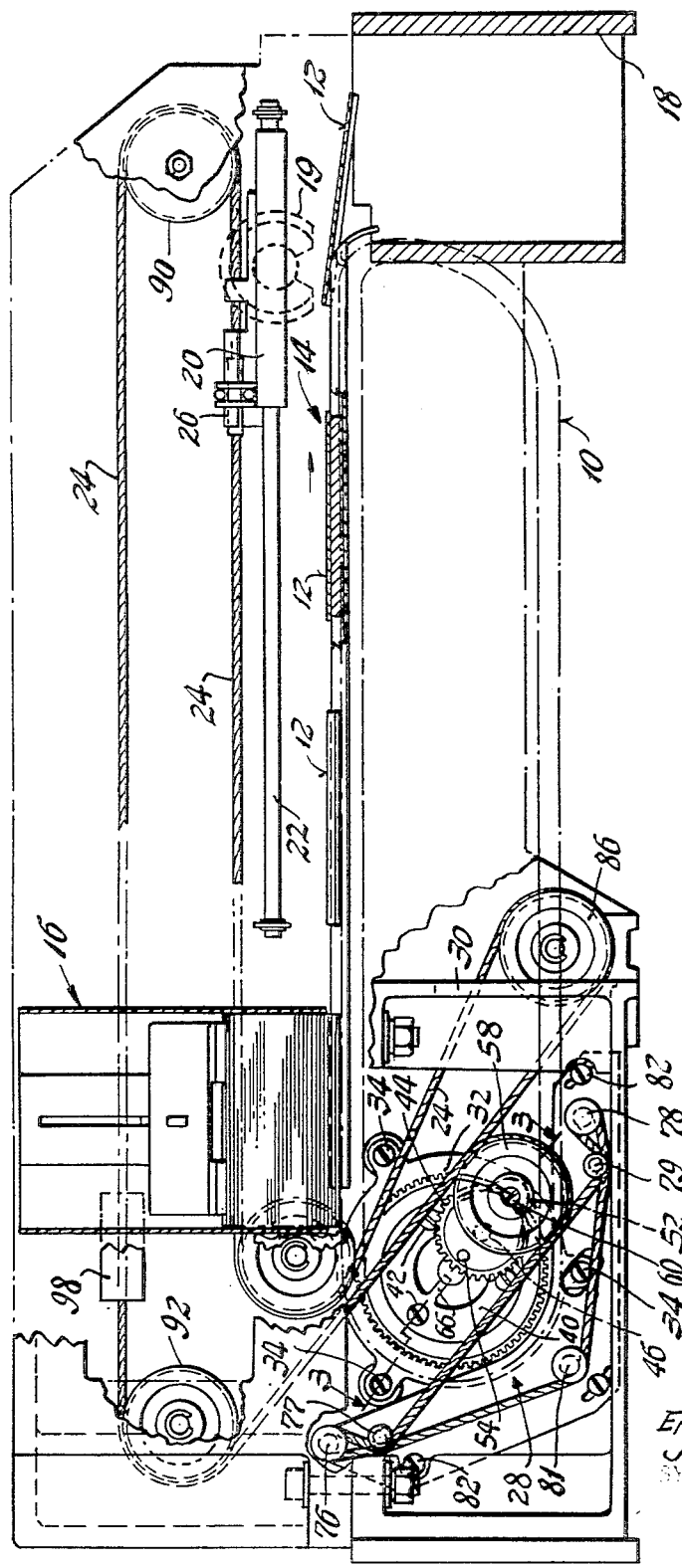
FIGURE 1 is a sectional elevational view of the drive mechanism embodying the present invention.

The drive system embodying the present invention is shown in the drawings in use in an addresser-printer type of machine. As can be seen in FIGURE 1 a continuous chain indicates as 10 carries address plates 12 to a printing station generally indicated as 14.

The address plates may be of the type disclosed in U.S. Patent 2,761,453. The chain 10 is driven by a drive system, not shown herein, and advances the address plates from a plate supply hopper 16 to the printing station 14, holds the plates at the printing station and then advances the plates to a stacking bin 18. During the printing operation, a sheet of paper or the like is advanced to the printing station 14, positioned over a plate 12 and held at that position during the printing operation. The paper advancing and holding mechanism does not constitute a part of this invention and is not shown herein. The printing operation is effected by moving an inking roller 19 across the surface of a sheet of paper at the printing station. The printing plate 12 is embossed with letters or graphic material which, when acting in conjunction with the ink roller, produces printing on the paper. The invention herein is concerned with moving a carriage 20 which carries the inking roller acoss the pinting station and back to an oiginal position without producing vibrating forces. The carriage 20 is directed through its path of travel by means of a guide 22 positioned above the print station and composed of a rod along which the carriage 20 slides. The carriage 20 carries the inking roller 19, and is attached to a cable 24. The cable 24 is part of a drive system indicated generally as 28 and which constitutes the invention herein.

DETAILED DESCRIPTION

The drive mechanism used herein contains a planetary gear which is rotated around the inside of an internal gear of twice the pitch diameter of the planetary gear. When a planetary gear is rotated around the inside of any internal gear, a point on the pitch line of the planetary gear will trace a path inside the internal gear. In the special case wherein the pitch diameter of the planetary gear is exactly one-half the pitch diameter of the internal gear, the path traced by any point on the pitch line of the planetary gear is a straight line passing through the center of the internal gear and equal in length to the pitch diameter of the internal gear, thus a rotary motion used to orbit the planetary gear around the internal gear can be translated into a straight line reciprocating motion equal to the diameter of the internal gear.

The mechanism, indicated generally as 28, is secured to the frame 30 of the machine in which it is operating. An internal gear 32 is secured to the frame of the machine by means of bolts 34 which hold the gear 32 in a fixed or a rigid position. The internal gear 32 consists of a ring having an opening in the center and gear teeth extending around the inside of the ring. In the opening in the center of the gear 32 there is a ball bearing 36 having its outer race secured to the gear 32 and its inner race supporting a drive member 38. The internal construction of the gear 32, the bearing 36 and the drive member 38 can be seen in the sectional view in FIGURE 3. The drive member 38 is attached to, or, as shown herein, integral with a clutch plate 39 which is part of the clutch mechanism providing a connection to the main drive system. A retaining plate 40 is secured to the drive member 38 by means of three screws 42, and retains the inner race of the ball bearing 36. The inner race of the ball bearing 36 is held from moving in the opposite direction from the retaining plate 40 by means of a shoulder on the drive member.

A planetary gear 44 is mounted for free rotation about a pin or shaft 46 by means of a sleeve bearing 48. The pin 46 extends into and is supported by the drive member 38 in hole 50. A bolt 51 extends through the clutch plate 39 and drive member 38 into a tapped hole in the pin 46 to secure the pin in the drive member. The pin 46 is a flanged pin having the flange in the center so that the bolt 51 draws from the flange against the drive member 38. The gear 44 is supported from the bearing 48 on the other end of the pin 46. The pin 46 and the gear 44 are located relative to the drive member 38 so that the teeth of the planetary gear mesh with the teeth of the internal gear. The pitch diameter of the planetary gear is exactly one-half the pitch diameter of the internal gear therefore the center of the hole 50 is positioned half-way between the center of the internal gear and the pitch circle of the internal gear.

The outer surface of the planetary gear 44 has an eccentric plate 52 secured thereto by means of screws 54. As can be seen in FIGURES 1 and 2 the eccentric plate 52 has a lobe which extends outward over the teeth of the gear 44. In the lobe of the eccentric 52 there is a hole supporting a shaft 56 directly above the pitch line of the planetary gear. The shaft 56 supports a sleeve bearing 57 and a double pulley 58 which are held in place by means of a screw 60 and a retaining cap 62. The pulley 58 is freely rotatable on the shaft 56.

The drive member 38 is mounted on the clutch plate 39 and has passing through the center thereof a shaft 64 which is used to drive or operate controls of the main machine. The retaining plate 40 has a tab 66 which extends downward into a key-way 68 in the shaft 64 to provide alignment between the drive member 38 and the shaft 64. Thus the drive member 38 is aligned with the shaft 64 and the pulley 58 is properly positioned relative to the operation of the controls of the main machine.

The pulley 58 consists of two integral pulley wheels 72 and 74. The wheels 72 and 74 have grooves to accommodate the cable 24 around the entire circumference thereof. As seen in FIG. 1 the cable 24 extends, in one direction around one of the pulley wheels so that it is in contact with approximately half the circumference of the pulley. A different portion of the same cable extends around the other pulley wheel in contact with the opposite portion of the pulley. Movement of the pulley would feed cable in two directions. Rotation of the drive member 38 carries the planetary gear 44 around the inside of the internal gear 32. The meshing of the teeth on the planetary gear 44 and the internal gear 32 causes the planetary gear 44 to rotate without slippage, thus causing the eccentric plate to rotate and the pin 46 to move in a circle relative to the pitch circle of the planetary gear. Since this is a Cardano mechanism, any point at the pitch line of the planetary gear will travel back and forth in a straight line through the center of the internal gear 32. As seen in FIGURE 2, the center line of the shaft supporting the pulley 58 is located directly over the pitch line of the planetary gear 44. The center line of the pulley shaft 56 then moves in a straight line across to the opposite side of the internal gear 32 and back to its original position. The movement of the pulley shaft 56 can be seen in the FIGURE 2 along with the orientation and movement of the eccentric plate 52.

The cable 24 is attached to both sides of the carriage 20 and drives the carriage 20 in either direction. The cable is driven by the pulley 58 in either direction. The pulley 58 acts in the manner of a capstan in that the cable 24 is partially wrapped around the pulley and is driven by rotating movement of the pulley. The opposite ends of the cable from the carriage are secured so that linear movement of the pulley causes the secured ends of the cable to rotate the pulley feeding out and taking in cable in the manner of a capstan. The cable 24 is essentially a closed loop which extends around the pins 76, 77, 78, 79 and 81 in an adjustment plate 80 though it is not necessary that the cable be one piece. The pins hold that portion of the cable 24 in a fixed position so that linear movement of the pulley 58 produces both take-up and feed-out of the cable. The movement of the pulley causes take-up and feedout of the opposite loop of the cable producing movement of the carriage 20. The cable 24 is not held completely rigid so that adjustment or relocating of the carriage may be accomplished by forcing movement of the carriage cable relative to the pulley. The adjustment plate 80 is secured to the frame of the main machine by means of a set of screws 82 extending through elongated holes in the plate 80 into the main frame. By loosening the screws 82 the position of the plate 80 may be moved the length of the elongated holes.

OPERATION

In operation the main machine, such as an addresser-printer, is driven by an electric motor which would provide a rotary motion to the clutch plate 39 is shown in FIG. 3. The clutch plate 39 rotates the disc member 38 in the bearing 36. The disc member 38 carries with it the retaining plate 40 having the tab 66 which extends into key-way 68 thereby imparting motion to the shaft 64 in timed relation to the rotation disc member 38. Rotation of the shaft 64 is used to control the operation of the main machine so that the movement of the printing carriage is in time relation to other operation of the machine.

As the disc member 38 rotates, it carries the pin 46 in a circular path around the inside of the internal gear 32. The planetary gear 44 is carried by the pin 46 and is caused to rotate about pin 46 by the engagement with the teeth of the internal gear 32. The rotating motion of the planetary gear 44 produced by engagement with the teeth of the internal gear 32 causes a shaft 56 and a pulley 58 supported from the eccentric plate 52 on the surface of the gear 44 to move backwards and forwards in a straight line through the center of the internal gear 32.

FIGURE 2 shows the various positions of the eccentric plate 52 and the shaft 56 as the gear 44 rotates around the internal gear 32. Since the shaft 56 is centered above the pitched circle of the planetary gear 44 it moves in a straight line back and forth through the center of the pitched circle of the internal gear 32. At the extreme points in the travel the shaft coincides with the pitch circle of the internal gear 32 thus following a path along a diameter of the internal gear. The pulley 58, since it is supported by the shaft 56, travels in a reciprocating manner a distance equal to the diameter of the internal gear 32. As can also be seen in FIGURE 2 the cable is wrapped around the pulley 58 so that if the cable is fixed at the point indicated as 94 in FIGURE 2 and the pulley is in the position indicated generally as A, then as the pulley moves from the position A to the position B the cable 24 is drawn around the pulley 86 and is fed towards the pulley 92. As the pulley moves back from the position shown at B to the position in at A, the cable is held at the fixed point 95 and drawn from around the pulley 92 and fed towards the pulley 86. This modified capstan type of action produces cable movement shown by the arrows in FIGURE 2 and results in a reciprocating motion of the carriage 20. In operation the movement of the carriage is offset by a counter weight 98 which moves in the opposite direction from the carriage and prevents vibration due to unbalanced forces.

While the invention has been described with reference to the structure disclosed herein, it is not confined to the details set forth, and this application is intended to

What is claimed is:
1. A mechanism for reciprocating a movable carriage over a first linear path, the mechanism comprising, in combination:
   conversion means for translating a rotational input motion to a reciprocating linear movement;
   a pulley rotatably mounted to be reciprocated by the conversion means over a second linear path remote from the first linear path and having a length less than the length of the first linear path;
   a cable secured to the carriage and extending in a first direction along the first linear path and ultimately around a portion of the periphery of the pulley to an endpoint thereof secured against movement;
   whereby movement of the pulley in one direction over the second linear path causes the cable to pull the carriage in the first direction over the first linear path; and
   means secured to the carriage and extending along the first linear path in a second direction opposite the first direction to pull the carriage in the second direction upon movement of the pulley in a direction opposite to the one direction.

2. The mechanism defined in claim 1 wherein the cable is a first cable and the means secured to the carriage is a second cable extending to and around a portion of the pulley periphery in the opposite direction of the first cable and from the pulley extending to an endpoint thereof secured against movement.

3. The apparatus of claim 1 wherein the conversion means consists of, a fixed ring having internal teeth a planetary gear meshing with the teeth of the internal gear and having a pitch diameter on one-half the pitch diameter or the internal gear; and
   wherein the pulley is mounted on the planetary gear with its center of the planetary gear.

4. A drive mechanism to convert rotary motion to linear motion and multiply the travel of the linear motion including:
   a stationary gear ring having internal gear teeth;
   a plurality gear meshing with the internal gear teeth and having a pitch diameter equal to one-half the pitch diameter of the internal gear teeth;
   means responsive to a rotating input motion to orbit the planetary gear about the gear ring;
   a pulley secured to the planetary gear with the center of the pulley at the pitch line of the planetary gear;
   whereby rotation of the planetary gear about the internal gear teeth produces straight-line movement of the pulley back and forth across the diameter of the gear ring in a reciprocating manner; and
   a cable system comprising cable secured to opposite sides of a movable carriage and extending from each side of the carriage separately around a portion of the pulley periphery in opposite directions and is then secured against movement at points spaced from the pulley such that, as the pulley is reciprocated, cable is simultaneously let out and taken up from opposite directions in alternating fashion to produce reciprocating linear motion of the carriage in excess of the straight-line movement of the pulley.

5. The apparatus of claim 4 further including counter weight means attached to the cable to offset the weight of the carriage and reduce vibrations and guide means to direct the carriage movement in a straight line.

6. A drive system for translating a rotating motion into elongated reciprocating linear movement of a printing carriage or the like inclduing:
   a fixed gear having internal gear teeth;
   a planetary gear positioned to mesh with the teeth of the fixed gear and having a pitch diameter of one-half the pitch diameter of the fixed gear;
   a rotating drive member supporting the planetary gear and adapted to carry the planetary gear through an orbital path wherein the planetary gear is rotated by interaction with the teeth of the fixed gear;
   an eccentric plate secured to the planetary gear and having a portion extending over the pitch circle of the planetary gear;
   a pulley rotatably monuted by the eccentric plate with its center over the pitch circle of the planetary gear;
   a cable connected to opposite sides of the movable carriage and extending from each side to the pulley, around the pulley in opposite directions and to separate secured positions spaced from the pulley; and
   cable guides positioned to direct the cable through a path wherein the carriage is pulled by the cable in either of two directions;
   whereby rotation of the drive member orbits the planetary gear to reciprocate the pulley and the pulley simultaneously takes up cable coming from one direction and releases cable coming from the other direction in alternating fashion to reciprocate the carriage over a linear path whose length exceeds the reciprocating path length of the pulley.

References Cited

UNITED STATES PATENTS

| 634,194 | 10/1899 | Woodward | 74—52 |
| 2,166,975 | 7/1939 | Sologaistoa | 74—52 |
| 3,027,771 | 4/1962 | Winfrey | 74—37 |
| 3,270,572 | 9/1966 | Zimmerle et al. | 74—89.22 |

FRED C. MATTERN, Jr., Primary Examiner

W. S. RATLIFF, Jr., Assistant Examiner